June 9, 1942.    E. C. HORTON    2,285,581
VEHICLE WATER SYSTEM
Filed Nov. 24, 1939
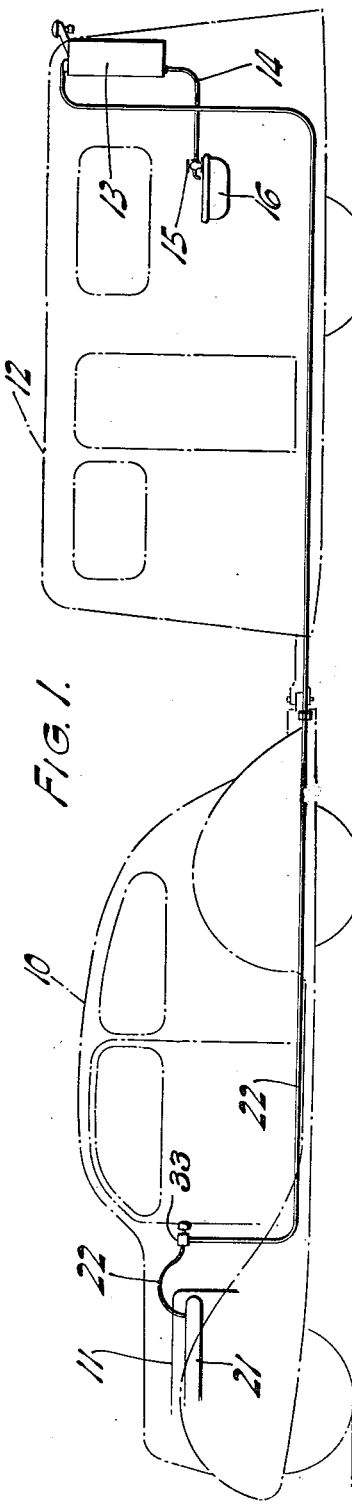
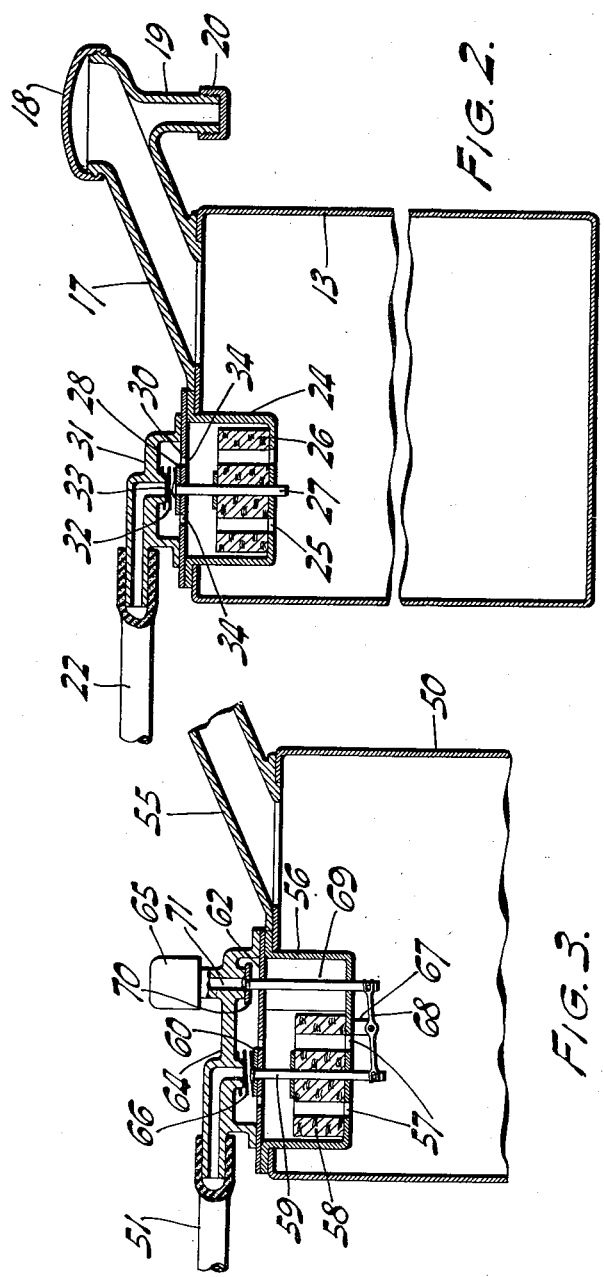
INVENTOR
ERWIN C. HORTON
BY
Beau, Brooks, Buckley & Beau.
ATTORNEYS Patented June 9, 1942

2,285,581

UNITED STATES PATENT OFFICE 2,285,581

VEHICLE WATER SYSTEM

Erwin C. Horton, Hamburg, N. Y., assignor to Trico Products Corporation, Buffalo, N. Y.

Application November 24, 1939, Serial No. 305,796

2 Claims. (Cl. 137—68)

This invention relates to a water supply system for automotive vehicle trailers and particularly to means for the replenishment or maintenance of such supply.

In trailer constructions it is conventional to provide a reservoir or tank for holding water to be used for the usual domestic purposes and it has heretofore been the practice to construct the reservoir or tank in such manner that it may be filled by removing a cover or the like and simply pouring in a replenishing supply. In my present invention novel means are provided by virtue of which the necessity for using a filling pail is dispensed with and whereby motive means are conveniently provided for transferring water from its location outside the trailer, usually at a lower level than the desired storage point within the trailer, into a trailer storage tank in a convenient, clean and efficacious manner.

In the accomplishment of the foregoing objects, use is made of a portion of the energy of the propelling engine of the vehicle with which the trailer is associated. In proceeding in accordance with the teachings of my invention a conduit is arranged between the intake manifold of the usual internal combustion engine of the vehicle proper and the water storage tank of a trailer associated therewith.

The subatmospheric pressure prevailing in the intake manifold during normal periods of operation of the engine is communicated to the interior of the storage tank and a filling conduit is connectible with the storage tank. The opposite end of this conduit may be inserted in the body of water from which a supply is to be taken and the pressure of the atmosphere will force a flow of water through the conduit and into the storage tank as long as the pressure within the latter is maintained below that of the atmosphere. Means are provided for effectively eliminating the possibility of drawing water from the storage tank into the conduit extending between the intake manifold and the storage tank.

In the drawing:

Fig. 1 is a general side elevational view of an automotive vehicle and an associated trailer provided with one form of apparatus arranged in accordance with the principles of my invention;

Fig. 2 is a longitudinal cross sectional view of the storage tank of this form of the invention; and Fig. 3 is a similar view of a modified form of storage tank and associated fluid connections.

In the drawing like characters of reference denote like parts throughout the several figures and the numeral 10 designates a conventional automotive vehicle having an internal combustion propelling engine 11. In Fig. 1 the vehicle 10 is shown as having associated therewith a trailer 12 which may be of the type which is arranged for dwelling purposes and is provided, as a part of its equipment for this purpose, with a water storage tank 13.

The storage tank 13 may be conveniently supported in the upper portion of the trailer compartment so that its contents may conveniently be made available by gravity flow through a conduit 14 leading from its lower portion to a tap 15 associated with a basin 16.

In the form of storage tank illustrated in greater detail in Fig. 2, a filling conduit 17 extends from the upper portion of the tank 13 and such conduit terminates in an upwardly directed opening, which is normally closed by a removable cap 18 and may be employed in filling the tank by pouring, and another opening or tap 19 which is likewise provided with a removable closure cap 20. The tap 19 is adapted to have secured thereto a conduit, preferably flexible, for use in filling the storage tank in a manner which will presently appear.

The propelling engine 11 of the vehicle 10 has an intake manifold 21 and a conduit 22 is in communication with the interior thereof and with the storage tank 13 and serves to communicate subatmospheric pressure existing in the intake manifold when the engine is in operation to the storage tank 13 whereby water may be drawn into the storage tank by connecting a conduit to the tap 19 and dipping the other end of the conduit into an external water supply, which will usually be found at a lower level than the level of water desired in the storage tank 13. In the forms of invention illustrated in Figs. 2 and 3 means are provided for closing the conduit 22 from communication with the tank when the water in the tank reaches a predetermined level and in this way the possibility of the entrance of water into the conduit 22 is obviated.

Referring to Fig. 2, the numeral 24 designates a cup-shaped holder having openings formed in its bottom as at 25 and secured to the upper portion of the tank 13 for supporting a float element 26 which may be formed of any buoyant material. The float 26 has secured to it a pin 27 which carries a valve plate or disc 28 and the valve 28 is arranged to extend through a cover element 30 which is disposed over the cup-shaped holder 24. A valve housing is formed by an inverted cup-shaped member 31 which is in turn disposed over the cover element 30 and leading upwardly from the member 31 is the conduit 22 to the intake manifold 21 of the vehicle engine 11.

If desired a spring 32 may be provided for the purpose of biasing the valve 28 to a lower unseated position, although when not acted upon by other forces the valve will move to a lowered position by the force of gravity acting not only upon the valve proper but upon the connected float 26 as well. In the embodiment now being described, a downwardly directed annular valve seat 33 is associated with the member 31 in such manner that the valve 28 will seat thereagainst when it reaches its upper limit of movement. Openings 34 are formed in the cover element 30 to permit free fluid communication between the underside of the cup-shaped member 31 and the interior of the holder 24 at all times.

A three way valve 35 is interposed in the circuit 22, preferably on the instrument panel so as to be within easy reach of the operator of the vehicle. Such valve may be of any conventional form and is adapted to have one of its ports connected to the portion of conduit 22 leading to the intake manifold, one to the portion of conduit 22 leading to the storage tank 13, and one to the atmosphere. In one position the two ports leading to the conduit portion 22 are directly connected, with the third port to the atmosphere closed off. This is the operative position of the valve 35. In its other position the portion of conduit 22 leading to the storage tank 13 is connected to the atmosphere through the valve 35 while the conduit portion leading to the intake manifold 11 is closed off.

The operation of this mechanism will be apparent from a consideration of the foregoing description. When the valve 35 is moved to the first of the positions described above, subatmospheric pressure is introduced to the tank 13 by means of the conduit 22 and the pressure within the tank 13 is reduced below that of the surrounding atmosphere. If, then, a conduit is connected to the tap 16 and its opposite end is disposed in a body of water under atmospheric pressure, flow of water into the tank 13 will take place. As the tank 13 becomes filled the float element 26 is moved upwardly until the valve 28 closes against the valve seat 33 thereby cutting off communication of subatmospheric pressure through the conduit 22 and further movement of water into the tank 13 is stopped. After a sufficient supply of water has been fed into the tank 13 further pressure communication may be stopped by movement of the valve 35 to its off position.

In the modification of Fig. 3 communication of subatmospheric pressure to a storage tank 50 is through a conduit 51. As in the previously described embodiment, a filling conduit 55 is provided and such conduit terminates in upwardly and downwardly directed openings provided with cover members, as in the modification of Fig. 2. The conduit 55 is broken away in Fig. 3 and such openings and cover members are consequently not shown in Fig. 3. In the modification now being described the control means comprises a cup-shaped member 56 associated with the upper portion of the tank 50. The cup-shaped member 56 is open at its under side as at 57 and supports a float element 58 in the same manner as in the embodiment of Fig. 2.

Also as in the previously described modification, the float member 58 has a rigidly associated pin 59 which carries a valve 60 arranged in open position to rest upon a cover plate 62. A valve chamber is formed by an inverted cup-shaped member 64 which is secured over the cover plate 62 and connected to the cup-shaped member 64 is a warning signal 65. The warning signal is of the type adapted to be operated by differential pressure to produce sound or any attention-arresting signal. The valve 60 may, if desired, be resiliently urged to a lower unseated position by a spring 66 but the weight of the valve itself and the float member 58 may suffice to insure an unseated condition of the valve during periods of operation of the tank filling means.

The conduit 51 is provided with a manual control valve which is similar in construction and operation to the control valve 35 of the embodiment of Figs. 1 and 2. Secured to the underside of the cup-shaped member 56 is a bracket 67 which gives pivotal support to a rocker arm 68, the opposite ends of which are slotted for engagement with the valve carrying pin 59 and a second pin 69 which carries a valve 70 normally engaging against a valve seat formed in the member 64 and having a port 71 leading to the warning signal 65. The weight of the float 58 and the bias of the spring 66 serve to keep the valve 70 in a closed position until such time as the float member is caused to move upwardly by reason of the water level in the tank 50 reaching a predetermined level, whereupon the float moves upwardly and the valve 70 is opened by pivotal movement of the rocker arm 68 and air enters the tank through the pressure operated warning signal 65. In this way the warning signal is actuated to apprise the operator of the fact that the tank is filled and that the pressure valve may be closed. Immediately subsequent to the beginning of operation of the warning signal the valve 60 is closed by further upward movement of the float 58. The warning signal 65 may serve temporarily as an atmospheric vent for the tank 56 until such time as the manual valve is moved to its off position.

While two modifications of apparatus incorporating the principles of my invention have been illustrated and described in detail, it is to be understood that my invention is not to be considered as limited thereby or otherwise than as defined in the appended claims.

I claim:

1. In a water supply system for vehicular trailers, an automotive vehicle having an internal combustion engine with an intake manifold, a trailer and a water storage tank associated therewith, and a pair of conduits connectible with the upper portion of said storage tank, one of said conduits communicating with the subatmospheric pressure obtaining in said intake manifold and the other of said conduits being adapted to be employed in drawing water into said storage tank, the one of said conduits having a pair of valves therein, one of said valves comprising a manually operable control valve for preventing retrograde flow of fluid through said conduit from said intake manifold to said storage tank, and liquid level responsive means in said tank and associated with the other of said valves whereby said other valve is automatically closed when the level of the water in the storage tank reaches a predetermined point.

2. In a water supply system for vehicular trailers, an automotive vehicle having an internal combustion engine with an intake manifold, a trailer and a water storage tank associated therewith, and a pair of conduits connectible with the upper portion of said storage tank, one of said conduits communicating with the subatmospheric pressure obtaining in said intake manifold and the other of said conduits being adapted to be employed in drawing water into said storage tank, a passage leading from said storage tank and a fluid operated warning signal in communication with said passage, a valve in said passage and normally held in seated position, and a float element having associated therewith means for unseating said valve when the liquid level reaches a predetermined point, thereby establishing fluid flow through said warning signal and into said tank to actuate the warning signal.

ERWIN C. HORTON.